United States Patent
Salisbury et al.

(10) Patent No.: US 9,129,603 B2
(45) Date of Patent: Sep. 8, 2015

(54) METHOD OF ENABLING A FOOLPROOF HOME ENERGY DEVICE CONTROL NETWORK INCLUDING HUMAN LANGUAGE CATCHPHRASES

(71) Applicant: Schneider Electric USA, Inc., Palatine, IL (US)

(72) Inventors: Brian Salisbury, Nashville, TN (US); Jason Lien, Murfreesboro, TN (US); Charles Reneau, Nashville, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 214 days.

(21) Appl. No.: 13/765,113

(22) Filed: Feb. 12, 2013

(65) Prior Publication Data

US 2014/0229183 A1  Aug. 14, 2014

(51) Int. Cl.
*G10L 25/48* (2013.01)
*G10L 15/22* (2006.01)
*H04L 29/12* (2006.01)

(52) U.S. Cl.
CPC ............... *G10L 15/22* (2013.01); *H04L 61/15* (2013.01); *H04L 61/3065* (2013.01)

(58) Field of Classification Search
CPC .............................. H04L 61/00; G10L 15/22
USPC ......................................................... 704/275
See application file for complete search history.

(56) References Cited

U.S. PATENT DOCUMENTS

| | | | | |
|---|---|---|---|---|
| 5,598,427 A | * | 1/1997 | Arthur et al. | 375/145 |
| 8,566,183 B1 | * | 10/2013 | Bonar et al. | 705/28 |
| 2005/0108407 A1 | * | 5/2005 | Johnson et al. | 709/228 |
| 2006/0004743 A1 | * | 1/2006 | Murao et al. | 707/4 |
| 2009/0157760 A1 | * | 6/2009 | Yasunaga et al. | 707/200 |
| 2012/0197455 A1 | * | 8/2012 | Lee et al. | 700/296 |
| 2012/0232882 A1 | * | 9/2012 | Zhang | 704/2 |

OTHER PUBLICATIONS

FILTRETE, Wireless Setup Guide, Mac OS X; Dated 2011; (10 pages).

* cited by examiner

*Primary Examiner* — Qian Yang
(74) *Attorney, Agent, or Firm* — Locke Lord LLP

(57) ABSTRACT

A foolproof method of adding network-enabled energy control devices to a home energy device control network by associating an easy-to-remember catchphrase composed of ordinary words with a unique MAC address or EUI identifier of the network-enabled device. The device manufacturer associates a unique catchphrase with each device and stores the catchphrases and associated MAC addresses in a database along with the device information required to commission the device onto the user's network. When the user enters the catchphrase, the catchphrase is sent to the manufacturer's server for retrieving the MAC address and corresponding device information. When a valid catchphrase is entered and accepted, the device can be commissioned onto the user's network.

21 Claims, 4 Drawing Sheets

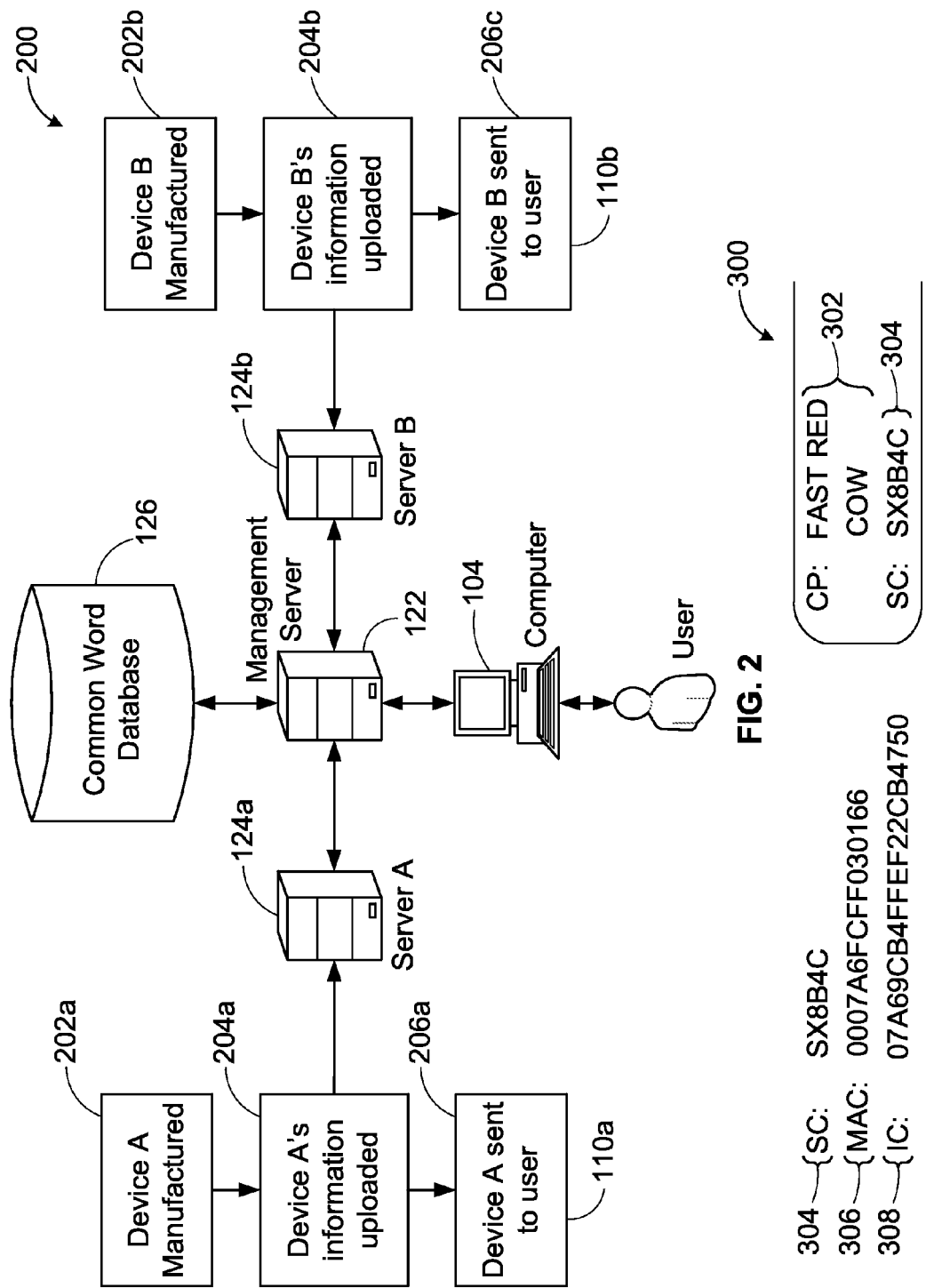

METHOD OF ENABLING A FOOLPROOF HOME ENERGY DEVICE CONTROL NETWORK INCLUDING HUMAN LANGUAGE CATCHPHRASES

FIELD OF THE INVENTION

The present disclosure relates to systems and methods of commissioning network-enabled devices, and, more particularly, to foolproof systems and methods of commissioning or adding energy control devices to a home energy device control network using easy-to-remember and easy-to-understand human-language catchphrases.

BACKGROUND

Network-enabled devices have a network interface that must be uniquely identified on a network to differentiate its address from other physical or virtual devices on the network. The conventional way to differentiate different network interfaces is to assign, depending on the jurisdiction, a Media Access Control (MAC) address or an Extended Unique Identifier (EUI) to each device. A MAC address or EUI identifier is a long sequence of meaningless (to a human) hexadecimal digits, typically twelve or sixteen (in the case of EUI-64), and typically is printed on a small label affixed to the device. These hexadecimal digits are meaningful to a computing device, and the corresponding binary sequence of digits is used by the network and network-enabled devices to communicate with one another. To commission or add a new network-enabled device onto a network, an end user must enter the meaningless twelve- or sixteen-digit hexadecimal number using an input device into a computing device, often alternating glances between the area where the number is printed and the input device, each time trying to remember the last value entered. This commissioning process, particularly for "lay" users who are not technologically savvy, can be prone to input error, meaningless to the user, and frustrating. For systems where a manufacturer desires to provide many network-enabled devices, making the device commissioning process more meaningful and simplifying it is advantageous.

What is needed is a foolproof way of commissioning new network-enabled devices onto a network to simplify the commissioning process and to make it meaningful to the installer or end user. Aspects of the present disclosure fulfill these and other needs.

BRIEF SUMMARY

Generally speaking, some aspects of this disclosure relate to a foolproof way of setting up a home energy management network using "catchphrases" composed of common words instead of a nonsensical and meaningless (to a human) string of digits that have no meaning to the human user. This disclosure is generally organized in two parts integrated into a comprehensive network commissioning implementation. From a device manufacturer standpoint, methods and systems are disclosed for a manufacturer of network-enabled energy devices to assign meaningful catchphrases to the network interfaces of each of the energy devices being produced for installation by an end user. From an end user standpoint, systems and methods are disclosed for the end user to use the catchphrase assigned to the energy device to commission that energy device onto the user's energy management network.

On the manufacturer side, the human-language phrases can be managed according to a centralized or decentralized implementation. In a decentralized implementation, a server controlled by the manufacturer operates to associate a unique human-language phrase composed of ordinary human-spoken words with each energy device being produced for installation by an end user. In a centralized implementation, a management server not controlled by the manufacturer associates the human-language phrases with each energy device produced by one or more manufacturers. Under either implementation the server can use an automated rule set to define any combination of the grammatical structure of the phrase (e.g., two adjectives followed by a noun), the maximum length of the phrase and/or each of the words that form the phrase, and rules for eliminating words or phrases that are offensive, confusing, repetitive, difficult to remember or spell, and the like. The words are stored in one or more word stores of a common word database, and these word stores are queried by the server to form the phrases that are associated with the energy devices. All this occurs before the energy device is shipped from the manufacturer. The manufacturer publishes the catchphrase, such as by printing it on a label that is affixed to the energy device or by publishing the catchphrase via an email, text message, or a web page, for later reading by the end user. Because each network interface of each energy device is typically assigned to a unique MAC address or EUI identifier, every catchphrase must be mutually distinct from all other catchphrases. Depending on the number of words and grammatical structure of the phrase, more word combinations can be formed than devices that any given manufacturer can reasonably be expected to sell.

On the end user side, the end user is made aware of the publication of the catchphrase. For example, the end user can read the catchphrase if it is printed on the energy device or retrieve the catchphrase from an email, web page, or text message sent or hosted by the manufacturer. The end user connects a coordinator or master device to an Internet-connected router, and inputs the catchphrase into a computing device that is connected to the Internet via the router. The computing device sends the catchphrase to a management server connected to the Internet, which retrieves the MAC address or EUI identifier associated with the catchphrase, and confirms that the inputted catchphrase is valid. The management server then sends the information required to commission the energy device onto the user's home energy management network, thereby completing the commissioning process for the end user. Apart from connecting the coordinator or master to a router and inputting the catchphrase into an Internet-connected computing device, the remainder of the commissioning process is completely transparent to the user and requires no further input or involvement by the user. In this manner, the commissioning process is truly foolproof and easy.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of this disclosure will become apparent upon reading the following detailed description and upon reference to the drawings.

FIG. 2 is a block diagram for associating catchphrases for different devices in which the catchphrases are managed centrally by the management server according to an aspect of the present disclosure;

FIG. 3 is an example of information published on a tangible medium, such as a label or a display device;

Figure 1:
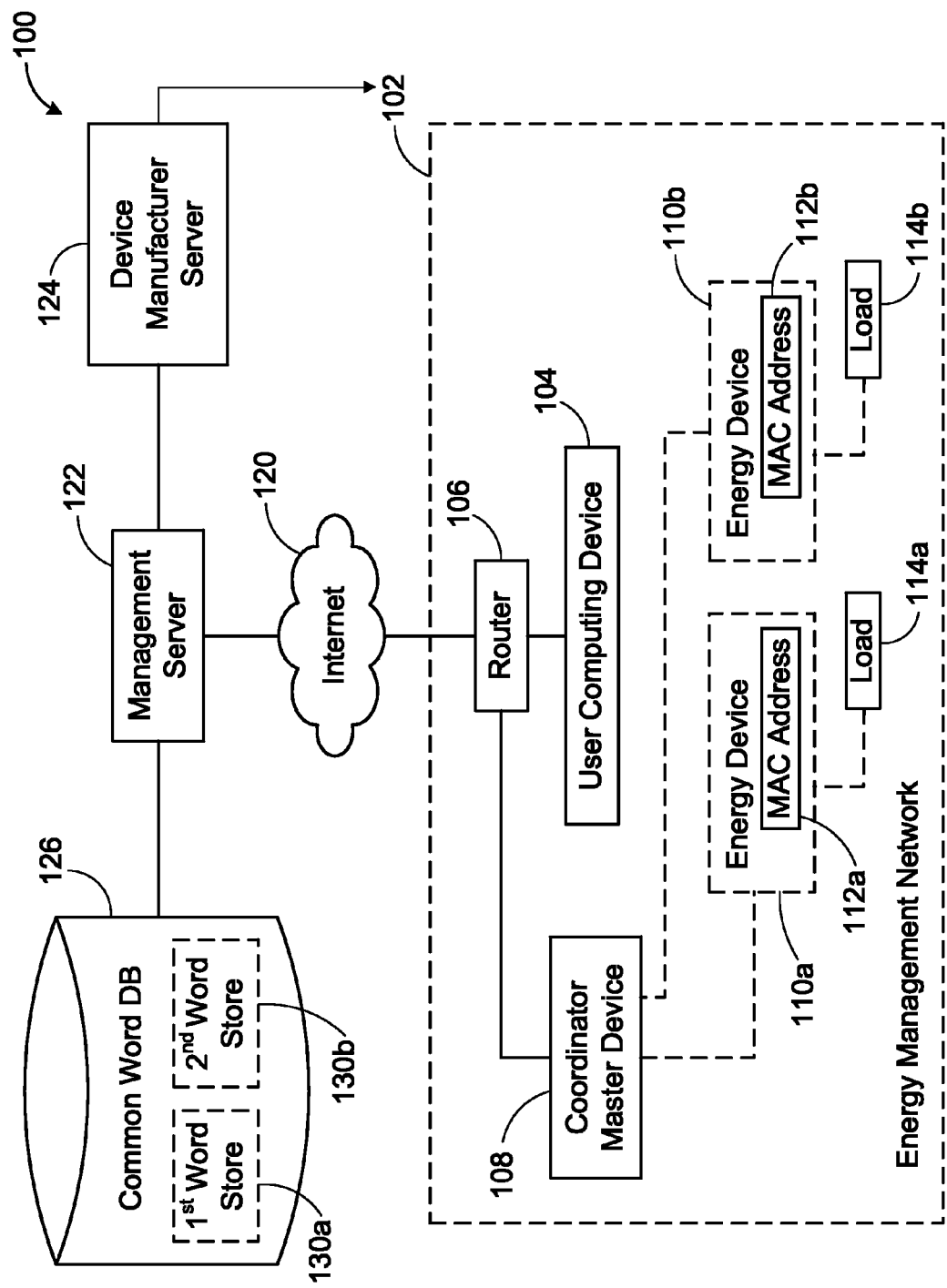
FIG. 1 is a functional block diagram of an energy management system that includes an energy management network according to an aspect of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

A human-language phrase, as that term is used in this disclosure, is composed of one or more ordinary human-spoken words. "Human-spoken" is differentiated from machine languages that are interpreted by machines, such as object code. "Ordinary" means that the human-spoken word is a valid word that can be found in a dictionary of the human language to which the word belongs. For example, the words "red," "fast," and "cow" are examples of ordinary human-spoken words in the English language. The word "garbageygook" can be spoken, but is not ordinary, because it cannot be found in an English dictionary. In one aspect, but not necessary, the human-spoken words from which the human-language phrase is formed are capable of being spelled correctly by a human of average intelligence and having completed at least a primary education or equivalent, or by a human who has a basic literacy. In the United States, for example, the primary education includes grades Kindergarten through eighth grade, and most children reach age 15 by the time they complete their primary education. Words such as "red," "fast," and "cow" can be correctly spelled by most humans of average intelligence who have completed at least a primary education or who have a basic literacy as defined by the United Nations Educational, Scientific and Cultural Organization (UNESCO). The object here is not to insult the intelligence of the end user, but rather to simplify the commissioning process by constructing phrases that are very easy to recall and to spell.

Moreover, particularly in the English language, there are numerous words that are commonly misspelled, such as "gauge" or "neighbor," and these words can be avoided even though they are ordinary. Other words or word combinations, such as "depend" and "deep end," which are examples of oronyms, can be avoided to avoid confusion when trying to recall the phrase or conveying it verbally. Furthermore, questionable or objectionable words can be avoided, such as "ass" in favor of "donkey." For convenience and ease of discussion, the term "human-language phrase" will sometimes be referred to herein as a catchphrase, even though that moniker is narrower than its intended scope. In other words, in this disclosure, the term "catchphrase" as used herein has the same meaning and scope as the term "human-language phrase." The rules governing how human-language phrases are formed and which are avoided are referred to as a rule set, as explained in more detail below. These rules can be automated, i.e., carried out by a controller.

This disclosure first introduces the components that can be used in various implementations disclosed herein, and then provides examples of the various implementations. Turning first to FIG. 1, there is illustrated a functional block diagram of an energy management system 100 that includes an energy management network 102. The energy management network 102 can be an energy device control network that connects multiple energy management devices together for monitoring and managing a consumption of energy (such as electricity, water, or gas) by energy-consuming loads in a building. The energy management network 102 includes a computing device 104, such as a personal or tablet computer, connected to a router 106. A coordinator or master device 108 is connected to the router 106, such as by an Ethernet cable. Multiple energy devices or energy control devices 110a, 110b are shown communicatively coupled to the master device 108, such as over a wireless connection. Each of the energy devices 110a, 110b includes a unique MAC address (or EUI code) 112a, 112b that uniquely identifies a network interface of that device 110a, 110b on the energy management network 102. Optionally, each of the energy devices 110a, 110b can also include a unique installation code (described below), which can be composed of 32-36 alphanumeric characters. Each of the energy devices 110a, 110b is connected to a respective load 114a, 114b in a building such as a residential home or a commercial building. The router 106 is communicatively coupled to a computing network 120, such as the Internet, and conventionally allows communication between the computing device 104 inside the energy management network 102 and other devices outside the energy management network 102 that are also communicatively coupled to the computing network 120. A management server 122, one or more device manufacturer servers 124, and a common word database 126 are each communicatively coupled to the computing network 120. The common word database 126 can include a first word store 130a and a second word store 130b. The energy management network 102 can be a subset of the computing network 120, or the energy management network 102 can correspond to a private local area network in a user's residential home.

Each of the energy devices 110a, 110b is configured to monitor or manage a consumption of energy by a load 114a, 114b that consumes the energy or to control the load 114a, 114b to control the consumption of energy by the load 114a, 114b. An example of an energy device is a "smart" thermostat that is configured to allow remotely controlled or automatic temperature adjustments to heating, ventilating, or cooling loads of an HVAC system. Another example of an energy device is an energy monitor control display that is configured to allow a user to control thermostats, lights, electronics, appliances, and other loads via a user interface such as a touchscreen as well as view on a video display load usage and/or energy savings on a real-time, daily, weekly, monthly, yearly, or other periodic basis. Another example of an energy device is a "smart" plug that allows remote operation of a load that is plugged into the smart plug. Another example of an energy device is a load control scheduler that supports scheduling for heavy loads (e.g., appliances, HVAC units, pumps, hot water heaters) and automatic switching such loads on or off to reduce or optimize energy consumption. Another example of an energy device is an electric vehicle charging system (EVCS) that supplies energy from a utility source or a solar energy source to an electric or hybrid vehicle whose driveline is powered at least by an electric motor. The energy device can be, though not necessarily or exclusively, remotely controlled from a web browser in communication with the master device 108 or from an application running on a portable computing device such as a smartphone and in communication with the master device 108. The energy device is network enabled in that it is connectable to a computer network, such as the energy management network 102 when the proper credentials have been supplied. Adding a new energy device to a network is called commissioning the energy device. By "adding," it is meant that the master device 108 accepts the energy device (e.g., permits other network-enable devices to receive communications from that energy device's network interface) and allows the energy device to communicate with the master device 108 and/or to other already commissioned energy devices on the same network 102.

The network interface of each network-enabled energy device 110a, 110b, therefore, includes a unique identifier that is different from all other identifiers associated with the respective network interfaces of every other energy device. This unique identifier can be in the form of a MAC (media access control) address or an EUI (extended unique identifier) identifier, which is a long sequence of hexadecimal digits (typically 12 or 16 digits) that are nonsensical and meaningless to the user and difficult to memorize or remember. An example of a MAC address 306 is shown in FIG. 3. To enter such an address, the user typically enters three or four hexadecimal digits at a time, alternating glances between the label on which the address is printed and the human-machine interface by which the address is entered into the computing device 104, and trying to remember the last value entered. The MAC address or EUI identifier is stored in a secure area of a memory device of the energy device 110a, 110b.

The common word database 126 includes the ordinary human-spoken words that can be combined to form unique human-language phrases that are mutually distinct from one another. All of the human-language phrases can be stored in the common word database 126, or, the common word database 126 can include multiple word stores (e.g., storage areas or partitions), such as a first word store 130a and a second word store 130b. In an implementation, the first word store 130a contains adjectives only and the second word store 130b contains nouns only. In examples where each of the human-language phrases are composed of two adjectives and one noun, many combinations of human-language phrases can be formed from a relatively small number of words. For example, if there are 232 unique adjectives stored in the first word store 130a and 200 unique nouns stored in the second word store 130b, then the total number of mutually distinct human-language phrases that can be formed from two adjectives selected from the first word store 130a and a single noun selected from the second word store 130b is 232×232×200 or about 10.76 million. Optionally, combinations composed of duplicate adjectives (e.g., red red cow) can be eliminated, which reduces the total number of word combinations to around 10.71 million. Thus, in this example, a manufacturer of energy devices can produce about 10.71 million energy devices each associated with a unique human-language phrase that is easily recalled and meaningful to the user (e.g., "red fast cow" or "big blue truck"). The number of words needed in the database 126 is a function of how many devices a particular manufacturer expects to be commissioned. Of course, the database 126 can be expanded as needed to create additional phrases if demand exceeds the manufacturer's expectations. The foregoing and other rules henceforth governing how human-language phrases are composed can be automated and carried out by a controller, such as a controller of the management server 122 or device manufacturer server 124.

In the English language, adjectives are placed before the nouns they qualify, but in other human languages, the reverse is true. Thus, to accommodate different languages, different word stores can be stored in the database 126 with different rules for how human-language phrases are created from words selected from the different word stores. For example, for French catchphrases, a noun can be selected as the first word for a human-language phrase, followed by an adjective, to complete the human-language phrase.

The total length of the human-language phrase should not exceed the number of digits in the MAC address (e.g., 12 or 16), though in some aspects the human-language phrase can exceed the number of digits in the MAC address. For example, a rule can be created to limit the total number of characters to ten or eleven, and the words selected from the word stores 130a, 130b must form a phrase that has no more than a maximum number of characters (e.g., ten or eleven) without considering spaces between words as characters. For example, the human-language phrase "red fast cow" is composed of ten alphabet letters.

Alternately, short, simple, mutually distinct sentences can be used instead of phrases, such as "the cow jumped over the moon." Each unique sentence is stored in the database 126.

The computing device 104 includes a human-machine interface, such as any combination of a touchscreen, a keyboard, or a mouse, a video display, a network interface, and a controller or processor. The network interface of the computing device 104 is communicatively coupled to the router 106 by a wired or wireless link.

The master device 108, sometimes called a coordinator, manages or coordinates communications between and among the computing device 104 and the various commissioned energy devices 110a, 110b on the energy management network 102, and coordinates the commissioning of new energy devices sought to be added to the energy management network 102 by passing messages via the router 106 between the management server 122 and the new energy device. As explained in more detail below, the authentication of the human-language phrase is carried out, in one implementation, by the management server 122, which returns the associated MAC address back to the master device 108 over the computer network 120, so the master device 108 sits between the management server 122 and the energy device, which has yet to be commissioned, and coordinates the commissioning of a new energy device to the network 102.

The device manufacturer server 124 is operated or controlled by the manufacturer of the energy device 110a, 110b. This server 124 is responsible for assigning a human-language phrase to each of the network-enabled energy devices produced by that manufacturer. By "network-enabled" it is meant that the device at a minimum includes a network interface and an associated MAC address or EUI identifier (these terms are interchangeable herein). At the point of manufacture, before the energy device is shipped to an end user, the manufacturer assigns a unique catchphrase to each of the energy devices and associates the catchphrase with the MAC address or EUI identifier, and optionally other information. For example, as shown in FIG. 3, each device can include the catchphrase 302, a short code 304, a MAC address 306, and an installation code 308. The short code 304 is a code composed of six alphanumeric characters and corresponds to the MAC address 306. The short code is nonsensical and does not form a human-language word. The user can commission the device 110 by entering the catchphrase 302 or the short code 304 or the MAC address 306. The installation code 308 is an optional code that is used by the master device 108 for security and integrity checks for devices 110 that attempt to join the energy management network 102. The installation code 308 is typically a nonsensical (to a human) alphanumeric phrase composed of 32-36 digits, and can be as meaningless to the end user as the MAC address 306. The installation code 308 can optionally be associated with the catchphrase 302 along with the MAC address 306. In this example, this saves the end user from having to enter both the MAC address 306 and the long installation code 308, as the catchphrase 302 once entered correctly will return both the MAC address 306 and the installation code 308.

The catchphrase 302 is published by the manufacturer of the device 110. By "publish" it is meant that the catchphrase 302 is made known to the end user so that the end user has an awareness of the ordinary words that form the catchphrase 302. For example, a publication can occur by disposing (e.g., printing or etching) the catchphrase 302 on a tangible medium 300, such as a label, a packaging, or a packaging insert, affixed to or included with the electronic device the human-language phrase or catchphrase 302. By way of another example, a publication can occur by communicating the catchphrase 302 in electronic form (e.g., in an email, a text message, or on a secure web page) to a display device associated with, for example, a mobile phone, a personal computer or tablet computer, or the like. The user can become aware of the published catchphrase 302 by, for example, reading or hearing it.

FIG. 2 illustrates a block diagram for associating catchphrases for different devices in which the catchphrases are managed centrally by the management server 122. Like reference numbers in FIG. 2 refer to like elements introduced in FIG. 1. In this example, two device manufacturer servers 124*a*, 124 are both communicatively coupled to the management server 122 over the computer network 120. For example, two different manufacturers of devices 110 can access the management server 122, or the device manufacturer servers 124*a*, 124*b* can be controlled by the same manufacturer but disposed in different geographic areas (e.g., in different continents). When a first device, referred to as Device A 202*a* in FIG. 2, is manufactured by a first manufacturer, a unique MAC address is assigned to its network interface. The MAC address (and optionally an installation code) is uploaded to the first device manufacturer server 124*a* (204*a*), which in turn requests that the management server 122 create a human-language phrase to associate with the MAC address for the first device 110*a*. The management server 122 forms a unique human-language phrase using a rule set such as described above for prescribing how to form a human-language phrase from the words stored in the common word database 126. The management server 122 returns the newly formed human-language phrase to the device manufacturer server 124*a*, which associates the newly formed human-language phrase 302 with the corresponding MAC address of the device 110*a* (and optionally the installation code) and stores the association in a memory device (e.g., the device manufacturer server 124*a*). Once the association has been made, Device A 110*a* is sent to a user (206*a*) to be commissioned on the energy management network 102.

A human-language phrase can be associated with a MAC address (and optionally installation code) of a second device 110*b* in the same way. As mentioned above, the second device 110*b* can be made by the same or a different manufacturer that manufactured the first device 110*a* (202*b*). Each of the device manufacturer servers 124*a*, 124*b* stores the corresponding pairs of human-language phrases and their associated MAC addresses (and optionally installation codes). These associations are stored in the management server 122. The MAC address (and optionally installation code) of Device B's network interface is uploaded to the second device manufacturer server 124*b* (204*b*), which requests the management server 122 to create and return a catchphrase, and once the catchphrase is returned to the manufacturer server 124*b*, Device B 110*b* is sent to a user (206*b*) to be commissioned on the energy management network 102. When the devices 110*a*, 110*b* are made by different manufacturers, this implementation allows the same user to purchase devices made by different manufacturers and commission them on the same network 102.

Figure 4:
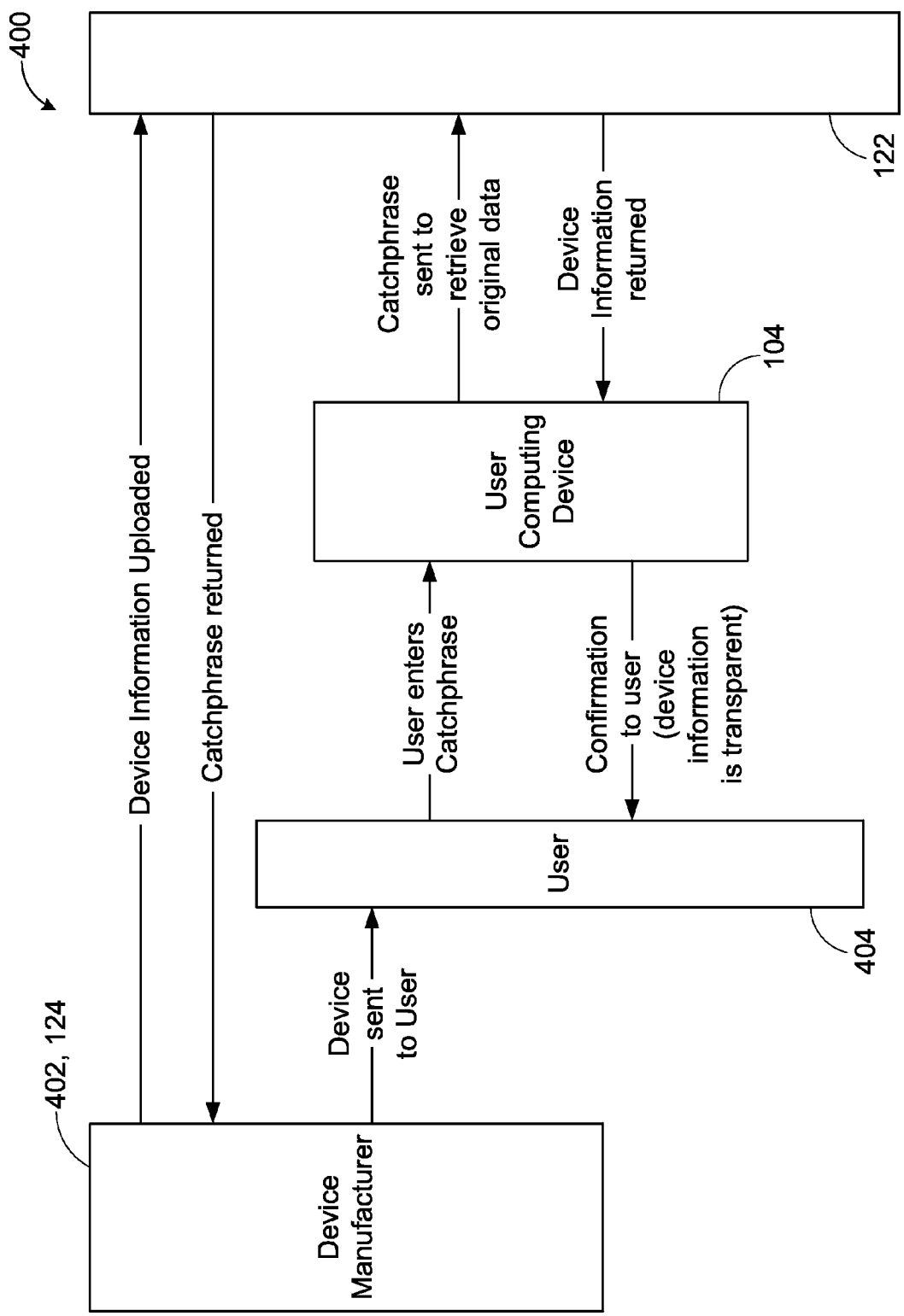
FIG. 4 is an information flow diagram of an example of how a catchphrase is associated with a device's network interface and then how a device is commissioned by a user using the catchphrase.

FIG. 4 illustrates an information flow diagram 400 of an example of how a catchphrase 302 is first associated with a device's network interface and then how a device, such as the device 110, is commissioned by a user using the catchphrase 302. A manufacturer of the device 110 (402), which operates or controls the device manufacturer server 124, uploads the device's MAC address to the management server 122 along with a request for a catchphrase. The management server 122 forms a catchphrase 302, for example using a rule set such as described above, and returns the catchphrase 302 in a reply to the requesting device manufacturer server 124. The device manufacturer 402 causes the energy device 110 to be sent to a user 404 who has purchased or will use the energy device 110 on an energy management network, such as the network 102. To commission the energy device 110 onto the network 102, the user 404 enters the catchphrase via a human-machine interface of a computing device 104, which sends the entered catchphrase over the computer network 120 to the management server 122. The management server 122 verifies that the catchphrase is associated with a MAC address in the database of associations stored in the management server 122. If the management server 122 locates the MAC address that corresponds with the verified catchphrase 302, the server 122 returns to the computing device 104 over the computer network 120 the device information needed to commission the device 110. The device information is the same information that would be returned if the user had entered the MAC address 306, but the difference here is that instead of entering a twelve- or sixteen-digit sequence of nonsensical hexadecimal values, the user enters a human-language phrase composed of ordinary words that are easy to understand. Finally, the device information is used to commission or register the energy device 110 onto the network 102 in a manner that is transparent to the user 404. Once a valid phrase has been entered and the associated MAC address confirmed, commissioning or registration of the energy device 110 proceeds automatically without further user involvement. The device information used to commission the energy device 110 returned from the management server 122 can conventionally include configuration information for configuring the energy device 110, device identification information, keys for security authentication, and the like. The present disclosure assumes that conventional device information is returned from the management server and is not a focus of the inventive aspects disclosed herein. The same device information that would be conventionally returned if a valid MAC address or EUI identifier were entered is also returned in the systems and methods of this disclosure.

The user 404, for example, is more likely to remember the phrase "fast red cow" 302 than 0007A6FCFF030166, and more likely to enter "fast red cow" 302 via a human-machine interface without any errors as compared with the nonsensical and meaningless string of hexadecimal values 0007A6FCFF030166. Thus, the catchphrase 302 offers a foolproof way of commissioning network devices onto a network. Frustration and input error are at least reduced or at best eliminated and the commissioning process for a new energy device is simplified, takes less time, and can be fun, especially when a fanciful or amusing catchphrase is used.

In another aspect, an already commissioned energy device, such as the energy device 110a, can commission another energy device 110b. In this aspect, both energy devices 110a, 110b include each other's catchphrases and associated MAC addresses in a secure area of their respective electronic memories.

Figure 5:
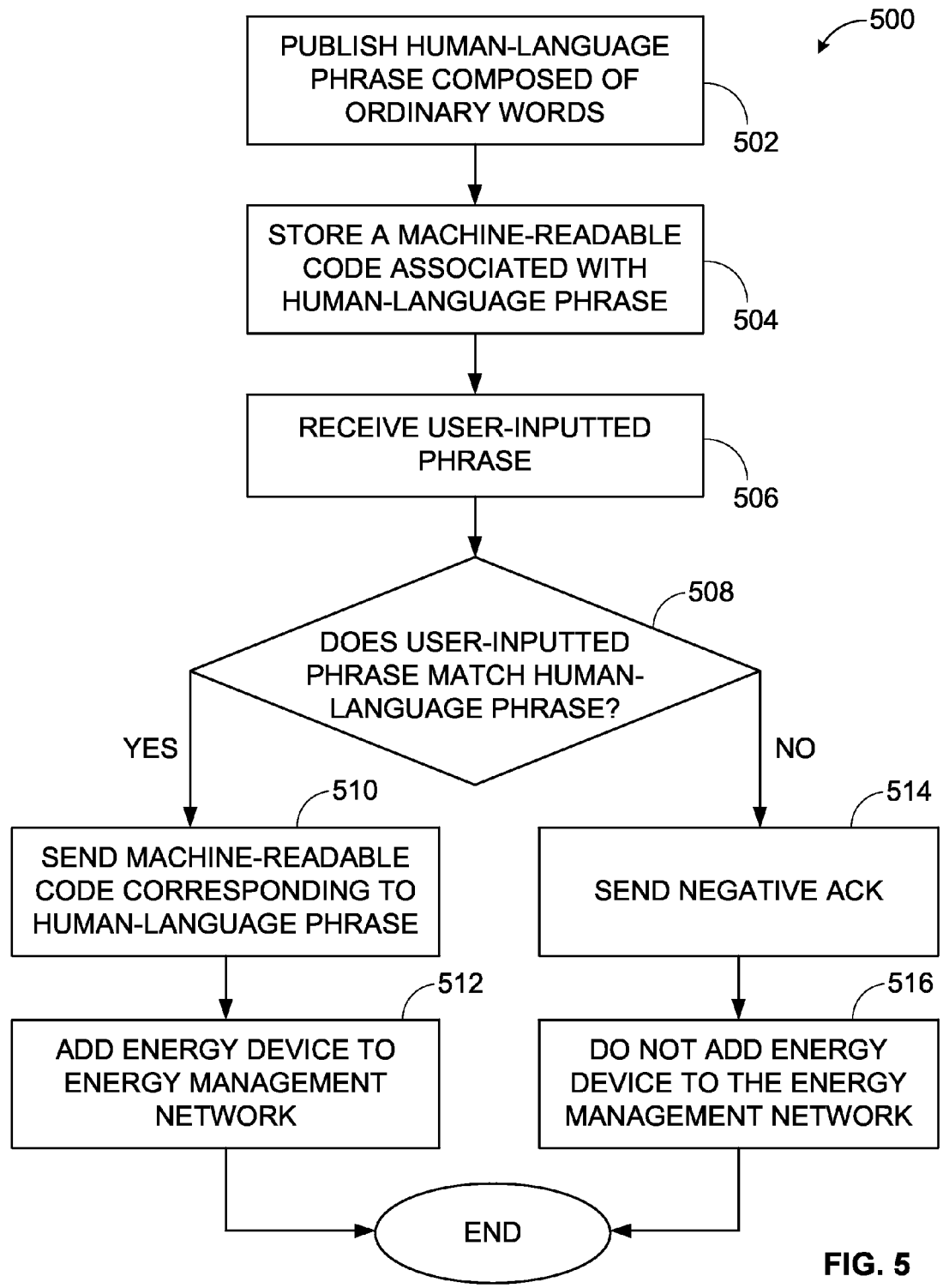
FIG. 5 is a flowchart diagram of an example method 500 for adding an energy device to an energy management network.

FIG. 5 is a flowchart diagram of an example method 500 for adding an energy device, such as the device 110, to an energy management network, such as the network 102. Some or all of the blocks shown in FIG. 5, described by way of example herein, represent one or more algorithms 500 that correspond to at least some instructions executed by the one or more controllers to perform the functions or steps disclosed. Any of the methods or algorithms or functions described herein can include machine or computer-readable instructions for execution by: a processor or controller, and/or any other suitable processing device. Any algorithm, software, or method disclosed herein can be embodied as a computer program product having one or more non-transitory tangible medium or media, such as, for example, a flash memory, a CD-ROM, a floppy disk, a hard drive, a digital versatile disk (DVD), or other memory devices, but persons of ordinary skill in the art will readily appreciate that the entire algorithm and/or parts thereof can alternatively be executed by a device other than a controller and/or embodied in firmware or dedicated hardware (e.g., it can be implemented by an application specific integrated circuit (ASIC), a programmable logic device (PLD), a field programmable logic device (FPLD), discrete logic, etc.).

According to the example method 500, a human-language phrase composed of ordinary human-spoken words, such as a catchphrase 302, is published (502). As described above, publication of the phrase can occur in different ways, such as by printing the phrase on a label or communicating the phrase electronically to a computing device, such as a smartphone. Optionally, a machine-readable code composed of machine-readable numbers (such as the MAC address 306 and optionally the installation code 308 shown in FIG. 3) is stored (504). For example, in FIG. 3, the tangible medium 300 can include the catchphrase 302 only. A user-inputted phrase is received over a computer network, such as the network 120, from a computing device, such as the computing device 104, operated by an end user 404 of the energy device (506). This user-inputted phrase should correspond to the catchphrase 302, but the user-inputted phrase may have typographical errors in it. The management server 122 searches for a catchphrase 302 matching the user-inputted phrase. The user-inputted phrase is compared with the human-language phrase associated with the energy device to be added to the energy management network (508). This comparison can be carried out, for example, by the management server 122 or by already commissioned energy device on the energy management network 102. If the user-inputted phrase matches the human-language phrase (e.g., "fast red cow"), at least the machine-readable code associated with the human-language phrase (or, alternatively, any device information that is stored on the management server 122 and associated with the human-language phrase) is communicated to the computing device 104 over the computer network 120 (510). As described above, additional device information can also be communicated by the management server 122 to the computing device 104. The computing device 104 indicates to the end user 404 that the energy device 110 is added to the energy management network 102 such that the energy device 110 is operable to communicate data over the energy management network 102 to other already added or commissioned energy devices on the energy management network 102 (512).

However, if the user-inputted phrase does not match the human-language phrase (508), the management server 122 or an already commissioned device on the energy management network 102 can send a negative acknowledgement back to the user computing device 104 indicating that the user-inputted phrase did not match the human-language phrase (514). The energy device 110 is not added to the energy management network 102 (516), and the method ends.

While particular embodiments and applications of the present disclosure have been illustrated and described, it is to be understood that the invention is not limited to the precise construction and compositions disclosed herein and that various modifications, changes, and variations can be apparent from the foregoing descriptions without departing from the scope of the invention as defined in the appended claims.

What is claimed is:

1. A method of adding an energy device to an energy management network, comprising:
   causing, by a manufacturer of the energy device, a human-language phrase composed of at least two ordinary human-spoken words, to be published to an end user of the energy device, wherein the human-language phrase is associated with, and unique to, the energy device;
   storing a machine-readable code composed of a plurality of machine-readable numbers and associated with the published human-language phrase;
   receiving over a computer network a user-inputted phrase from a computing device operated by an end user of the energy device;
   comparing the user-inputted phrase with the published human-language phrase associated with the energy device to be added to the energy management network;
   if the user-inputted phrase matches the published human-language phrase, communicating to the computing device over the computer network the machine-readable code associated with the published human-language phrase; and
   causing the computing device to indicate to the end user that the energy device is added to the energy management network such that the energy device is operable to communicate data over the energy management network relative to other added energy devices on the energy management network.

2. The method of claim 1, wherein the publishing the human-language phrase includes disposing on a tangible medium affixed to or included with the electronic device the human-language phrase or communicating the human-language phrase in a digital form as an electronic message.

3. The method of claim 1, wherein the human-language phrase assigned to the energy device is unique from all other human-language phrases assigned to other energy devices produced by the same manufacturer of the energy device and the other energy devices.

4. A method of commissioning an electronic device onto a computer network, comprising:
   associating in a memory device a human-language phrase composed of at least one ordinary human-spoken word with a machine-readable code composed of a plurality of machine-readable numbers;
   assigning the machine-readable code to the electronic device to uniquely identify the electronic device on the computer network;
   storing the human-language phrase and the machine-readable code in the memory device, wherein the human-language phrase is unique to the electronic device;

causing, by a manufacturer of the electronic device, the human-language phrase to be published to a user of the electronic device;

receiving a user-inputted phrase entered by the user of the electronic device;

comparing the user-inputted phrase with the human-language phrase stored in the memory device; and responsive to the user-inputted phrase matching the human-language phrase, communicating the machine-readable code associated with the human-language phrase.

5. The method of claim 4, further comprising responsive to the user-inputted phrase not matching the human-language phrase, not transmitting the machine-readable code associated with the human-language phrase.

6. The method of claim 5, further comprising communicating a negative acknowledgement indicating that the user-inputted phrase did not match the human-language phrase.

7. The method of claim 4, wherein the human-language phrase is composed of at least two human-spoken words each separated by a space, wherein the at least two human-spoken words include an adjective and a noun.

8. The method of claim 7, wherein the human-language phrase is composed of at least three human-spoken words each separated by a space, wherein the at least three human-spoken words include at least two adjectives followed by a noun.

9. The method of claim 4, wherein each of the words that form the human-language phrase does not exceed eleven letters.

10. The method of claim 4, wherein each of the words that form the human-language phrase is capable of being spelled correctly by a human of average intelligence and having completed at least a primary education or having a basic literacy.

11. The method of claim 4, further comprising:
storing on the memory device a plurality of human-language phrases, including the human-language phrase, wherein each of the human-language phrases is distinct from one another;

storing on the memory device a plurality of machine-readable codes, including the machine-readable code, wherein each of the machine-readable codes is distinct from one another and associated with corresponding ones of the plurality of human-language phrases;

forming each of the plurality of human-language phrases by combining at least one adjective stored in a first word store having a plurality of adjectives with at least one noun stored in a second word store having a plurality of nouns such that no two of the human-language phrases are composed of the same combination of adjectives and nouns selected from the first word store and the second word store, respectively.

12. The method of claim 11, further comprising:
associating each of the plurality of machine-readable codes with a corresponding one of a plurality of mutually distinct machine-readable codes.

13. The method of claim 4, wherein the machine-readable code includes a MAC address of the electronic device.

14. The method of claim 4, further comprising associating the human-language phrase with a second machine-readable code associated with the electronic device.

15. The method of claim 14, wherein the machine-readable code includes a MAC address of the electronic device and the second machine-readable code includes a unique installation code composed of a plurality of machine-readable numbers, wherein the installation code is required to commission the electronic device on the computer network.

16. The method of claim 4, wherein the computer network is energy device control network configured to connect a plurality of energy management devices together for monitoring and managing a consumption of energy by electrical loads in a building.

17. The method of claim 16, wherein the building is a residential home.

18. The method of claim 4, wherein the electronic device is an energy device configured to monitor or manage a consumption of energy by a load that consumes the energy or to control the load to control the consumption of energy by the load.

19. The method of claim 4, wherein the publishing includes disposing the human-language phrase on the electronic device or on a tangible medium affixed to the electronic device or to a packaging carton in which the electronic device is distributed to an end user of the electronic device or on a tangible medium that accompanies the electronic device when shipped to the user.

20. The method of claim 4, wherein a number of the plurality of the machine-readable numbers is at least ten.

21. The method of claim 20, wherein the machine-readable numbers are in a hexadecimal format or a binary format.

* * * * *